Feb. 8, 1966     T. F. JORDAN     3,234,312
METHOD OF ORIENTING THERMOPLASTIC PIPE
Filed Feb. 1, 1965     4 Sheets-Sheet 2

INVENTOR
THOMAS FRIEDRICH JORDAN

BY *Earl L. Tyner, Jr.*

ATTORNEY

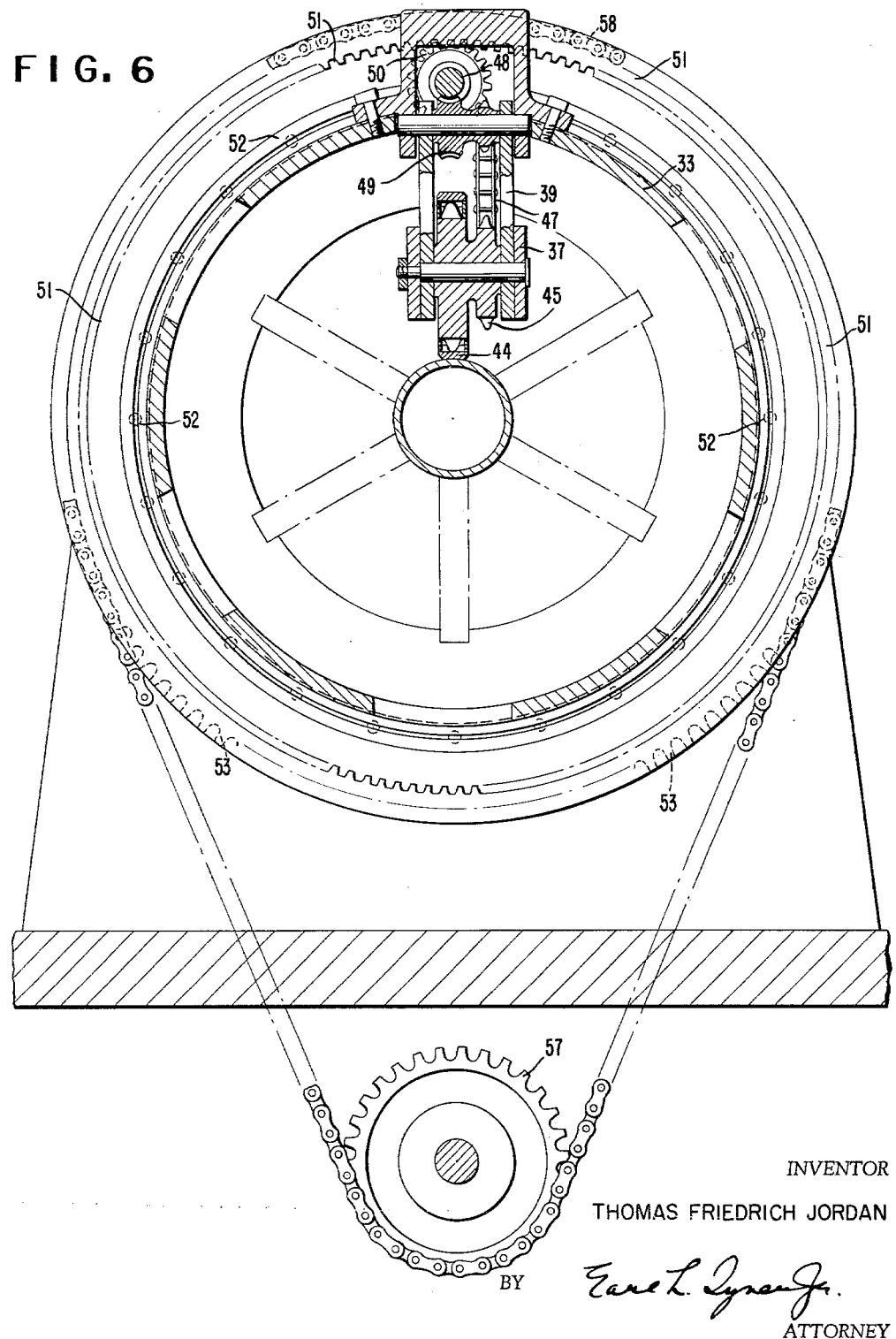

United States Patent Office 3,234,312
Patented Feb. 8, 1966

3,234,312
METHOD OF ORIENTING THERMOPLASTIC PIPE
Thomas Friedrich Jordan, West Chester, Pa., assignor to E. I. du Pont de Nemours and Company, Wilmington, Del., a corporation of Delaware
Filed Feb. 1, 1965, Ser. No. 432,065
3 Claims. (Cl. 264—209)

This patent application is a continuation-in-part of Serial No. 141,507, to the same inventor, filed September 28, 1961, and now abandoned.

This invention relates to a novel process for the production of oriented seamless thermoplastic pipe.

Thermoplastic pipe is now widely used for the transportation of fluids, for example, in irrigation projects. One of the most important properties of such pipe is its bursting strength.

It is well known that the bursting strength of pipe may be increased by increasing the wall thickness. It is also known that the strength of plastics may be increased in selected directions by orientation of the molecular structures. Moreover, the strength of the material may be modified to be more greatly improved in one direction than in another.

In general, molecular orientation in thermoplastics has been achieved by extension processes which include stretching and rolling, the improvement in strength being related to the extension of the material in the chosen direction. The amount of the improvement depends, in addition to the degree of extension, on the particular material employed, on its physical condition, and on the type of process, whether rolling or stretching, used to effect the extension.

When internal hydrostatic pressure is applied to a pipe, the pipe wall is subjected to stresses which vary in magnitude with the angle of the stress vector to the axis of the pipe. It can readily be shown that, for an unconstrained pipe, the stresses follow the relationship.

$$S_\theta = S_0(1+\sin^2\theta)$$

where $S_0$ is the stress in the pipe wall in the axial direction and $S_\theta$ is the stress at angle $\theta$. The stress in the hoop direction, $\theta=90°$, is $2 \times S_0$.

In order to obtain pipe of maximum bursting strength, it is desirable that the yield strength of the pipe be distributed in an angular relationship which is identical with the stress distribution relationship. Heretofore, however, it has been though sufficient to measure the hoop and axial yield strengths in order to determine whether this ideal condition has been achieved.

In the production of oriented thermoplastic pipe by rolling, for example, it has been found that although the hoop strength and axial strength could be increased in such a manner that the hoop yield strength was approximately twice the axial yield strength, the bursting strength of the pipe had not been increased to the extent predicted. It is now known that the rolling process tends to produce somewhat less than the ideal proportion of strength in the directions intermediate to the hoop and axial directions.

A defect of extension processes for the production of oriented thermoplastic pipe is that the degree of extension, and hence the degree of orientation which can be induced, is severely limited by the geometry of the system, as will now be explained.

Consider a thick-walled pipe, hereinafter called a billet, to be extended to form the oriented pipe structure.

Following the conventional definitions of extension in planar structures, the extension of the billet in the axial direction may be defined by $$X = \frac{L}{L_0}$$

where L is the final length of the product and $L_0$ is the initial length of the billet. The extension in the hoop or circumferential direction is defined as:

$$Y = \frac{D}{D_0}$$

wherein D is the mean diameter of the finished pipe and $D_0$ is the mean diameter of the billet from which the pipe is fabricated. The mean diameter is defined as the mean of the internal and external diameters of the pipe or billet. If the billet is a solid rod, having thus the maximum wall thickness possible, $D_0$ is taken as one-half of the diameter.

Assuming that the density of the thermoplastic material remains constant during the deformation process, which experiment shows to be a close approximation, it can be shown that the degrees of extension for a given pipe are limited by the equation $$XY^2 \leq \frac{D}{t}$$

where $t$ is the wall thickness of the finished product.

As an illustration of this limitation, if the product pipe is 2 inches in mean diameter with a wall thickness of $\frac{1}{16}$ inch, and further it is desired to make the extension ratio in the hoop direction twice as great as the extension ratio in the axial direction, the maximum degrees of extension are $X=2$ and $Y=4$. Thus, even in a relatively thin-walled product, the degree of extension is severely limited by the geometry of the system.

In practice, it is extremely difficult to expand a solid rod to a finished pipe product. It is therefor customary to start a thick-walled pipe as the starting billet, in which case, the limitation on the degree of extension is yet more severe than that demonstrated hereinabove.

It is therefore an object of the present invention to provide a method for introducing orientation into a tubular structure with a minimum of change in dimension.

Another object of this invention is to provide a method for selectively introducing orientation into thermoplastic pipe structures at angles intermediate between the hoop and axial directions.

The above objects are achieved by extruding a thick-walled cylindrical pipe of thermoplastic material, adjusting the temperatures of the pipe to the softening temperature of the thermoplastic, twisting the pipe, to a twist angle of from 10° to 70° measured from the axial direction and thereafter extending the pipe to increase its external volume at least about 10% to produce a finished pipe having biaxial orientation.

By thick-walled pipe is meant self-sustaining rigid pipe having a thickness sufficient to undergo the twisting process without buckling, and thereafter extension to produce a rigid, self-sustaining pipe. Generally the wall thickness should be at least about 100 mils.

By softening temperature is meant a temperature below, but close to, the melting point of the thermoplastic at which the thermoplastic is amenable to deformation without substantial elastic recovery, and at which the strain induced by the applied stress is distributed relatively uniformly throughout the body of the thermoplastic. The exact temperature range depends on the particular thermoplastic material. With some hydrocarbon polymers, temperatures as much as 40° C. below the crystalline melting point may be employed, although temperatures about 20° C. below the crystalline melting point are preferred. In the case of polyamides and polyoxymethylene thermoplastic resins, by contrast, it is necessary to operate at temperatures more closely approaching the melting point of the polymer, usually within 10° C. of the crystalline melting point.

The softening temperature is not a sharply defined temperature, but can be determined in any individual case by the examination of tensile specimens under extension at varying temperatures. Those temperatures at which extension of the specimen takes place without substantial "necking" of the specimen are suitable for the process of this invention.

The twisting process is extremely effective in imparting orientation to thermoplastic polymers in a helical direction. Even relatively small degrees of twisting, i.e. about 10° materially improve the strength of the material. If a small degree of twist is employed, the increase in strength is substantially along the axial direction, whereas at high degrees of twist the increase in strength is more nearly along the hoop direction. The maximum degree of twist which may be imparted will vary with the thermoplastic material, but generally corresponds to a twist angle of 70 to 80°, measured from the axial direction.

The orientation induced by the twisting process is essentially uniaxial in character, and the strength of the thermoplastic may be decreased in the direction normal to the helical direction.

In certain applications, for example, in the production of seamless cores for making wrapped pipe structures, the directional character of the helical orientation is a great advantage since it may be employed to complement the directional strength obtained by the wrapping.

More usually, however, it is desirable to impart biaxial orientation to the wall of the pipe. This may be accomplished by the combination of the twisting process with an extension process. Thus, a simultaneous stretching operation may be combined with the twisting step. In addition to tending to impart biaxial rather than uniaxial orientation, the stretching process tends to prevent buckling of the pipe. Stretching in both the hoop and axial direction may also be imparted after the twisting procedure by drawing the softened thermoplastic tubing over a conical mandrel whereby the diameter and length of the pipe are increased, or by inflating the softened tubing with a fluid under pressure according to the known prior art procedures.

The helically oriented pipe produced by twisting has substantially the same dimensions as the untwisted pipe. Extension, however introduces biaxial orientation, increases the linear dimensions and decreases the wall thickness, resulting in a change of external volume of the pipe (i.e. the length multipled by $\pi D^2/4$ where D is the external diameter) which can be employed as a measure of the extension. Inasmuch as the density of the plastic remains, and therefore the volume of the plastic remains substantially constant, the change of overall volume can be measured either from internal dimension or from external dimensions. In general the extension, whether in the axial direction or in the radial direction should be sufficient to increase the volume at least 10% in order to achieve an appreciable effect. The upper limit of extension can vary markedly with the nature of the plastic material, extensions of about $2^x$ in the radial and longitudinal directions can generally be achieved corresponding to a volume increase of 700%.

In a preferred embodiment of this invention, the extension of the tube after twisting is accomplished by a rolling process to extend the pipe in the circumferential direction from about 10% to about 100% increase in diameter.

The process of this invention will be better understood by reference to the accompanying drawings. In these drawings:

FIGURE 6 shows a cross-sectional view along the lines a—a' of the apparatus shown in FIGURE 5.

Figure 1:
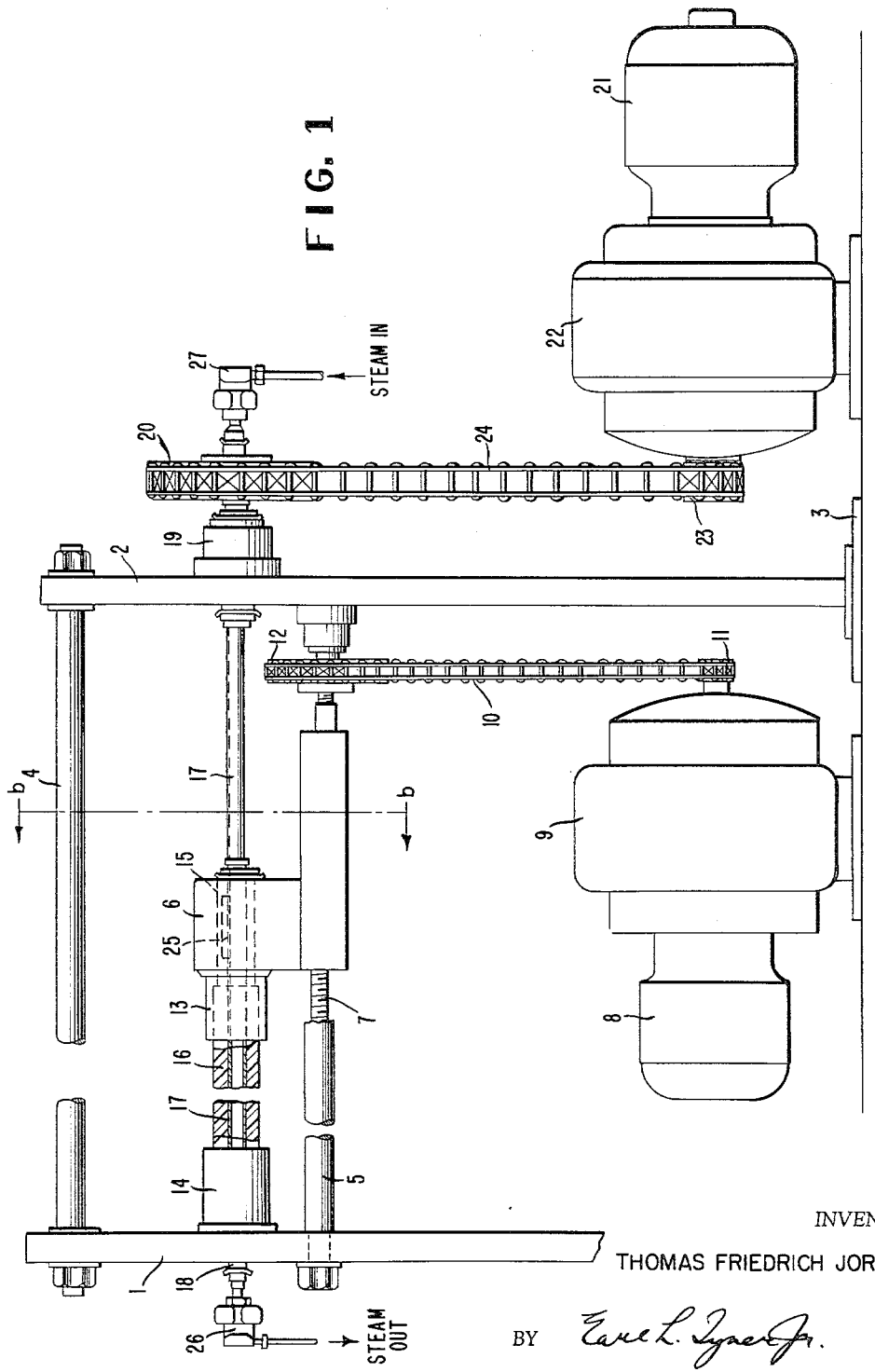
FIGURE 1 shows an elevation of an apparatus which may be employed to fabricate short lengths of twisted pipe.

Referring to FIGURE 1, the apparatus consists of two stout framing members 1 and 2 which are rigidly fixed to the floor by base plates 3. The framing members are further supported by three tie rods 4 and 5, which are partially shown in FIGURE 1. The lower pair of tie rods are spaced horizontally and form a support for a slideable carriage 6, which is driven horizontally by the rotation of a screw member 7 disposed centrally between the two lower tie rods and mounted on thrust bearings (not shown) in the framing members 1 and 2. The screw member passes through a threaded hole in the carriage 6 and is rotated by a motor 8 coupled to an infinitely variable reduction gear 9 from whence screw 7 is driven by a chain 10 and sprockets 11, 12 affixed to the infinitely variable drive and the screw 7, respectively.

The carriage 6 carries a rotating head 13 which rotates in a bearing 15. The head 13 is adapted to fit over the surface of the end of the thermoplastic pipe 16 which is to be twisted. A second head 14 is affixed to framing member 1. A hollow mandrel 17, which is a snug fit to the interior of the pipe, passes through a bearing 18 in framing member 1, along the center of the plastic pipe 16, through the rotating clamp 13 and through a second bearing 19 in framing member 2. The mandrel 17 has a keyway along its length. A sprocket 20 is keyed to the end of the mandrel adjacent to framing member 2, which is driven by a motor 21 and a positive infinitely variable drive 22, which rotates a sprocket 23 which in turn drives pulley 20 by means of a chain 24. A slideable key 25 couples the rotating head 13 to the mandrel 17 so that the head is driven by the rotation of the mandrel, yet is free to slide in a lengthwise direction. Two quick release rotating couplings 26, 27 are affixed to the ends of the mandrel which enable steam to be passed under pressure through the mandrel to enable the plastic pipe 16 to be heated to the desired temperature.

Figure 2:
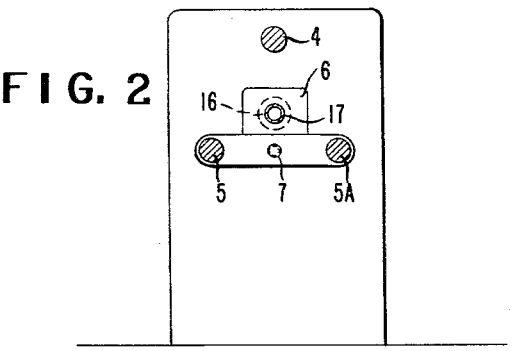
FIGURE 2 shows a sectional elevation of the apparatus shown in FIGURE 1.

In FIGURE 2, a sectional elevation of the apparatus described in FIGURE 1 taken along the line b–b' is shown which will make apparent the disposition of the tie rods 4, 5, and 5a, the driving screw 7, the rotating mandrel 17, and the pipe 16. In this diagram, the same numbers employed in FIGURE 1 are used to indicate the same parts.

Figure 3:
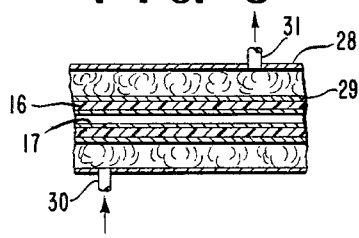
FIGURE 3 shows a steam-heated jacket which may be employed in conjunction with the apparatus shown in FIGURE 1 and FIGURE 2.

FIGURE 3 shows an arrangement for a steam-heated jacket which may be placed about the thermoplastic pipe which is to be treated by the process of this invention. This jacket consists of two concentric metal cylinders 28 and 29 which are united to form a closed annular jacket by end plates (not shown) and provided with a steam inlet 30 and a steam outlet 31. The annular jacket should fit the thermoplastic pipe billet closely in order to obtain the best possible heat transfer to the plastic material, and also to assist in maintaining the shape of the pipe during the twisting operation.

In operation, the mandrel 17 is withdrawn and the carriage 6 is backed up by the drive mechanism to enable the plastic pipe 16 to be inserted between the clamping heads 13 and 14. The carriage 6 is then returned to the starting position so that the ends of the pipe billet are within the clamps 13 and 14 which are then tightened. The mandrel 17 is then passed through the assembly and the steam fittings 26 and 27 are attached. Steam is supplied at the appropriate pressure to heat the pipe to the operating temperature, which is generally from about 5° to 40° C. below the crystalline melting point of the polymer from which the pipe billet is made. The exact temperature is not highly critical. In general, the sharper the melting point of the polymer, the closer the working temperature should be to the crystalline melting point, as will be appreciated by those skilled in the art. It is of some importance, however, that the temperature be uniform through the pipe walls and along the length of the pipe. To this end, the external heating jacket described in FIGURE 3 may be employed, or the pipe may be loosely wrapped with insulating materials. Sufficient time should be allowed for the assembly to come to steady temperature conditions. The pipe is then twisted by rotating the clamp 13 by means of the motor 21 and drive assembly 20, 22, 23, and 24. During the twisting operation, it is desirable to introduce some degree of stretching into the pipe. This may be achieved by withdrawing the carriage 6 by means of driving screw 7 and the driving mechanism 8, 9, 10, 11 and 12. The assembly is then allowed to cool and the pipe is removed. The pipe may then be further treated, for example, with a rolling step by passing the pipe through a rolling mill. In this step, it is highly desirable that the rolling head of the rolling mill, and the rolls associated therewith, rotate in the same angular i.e. right hand or left hand sense as the twisting direction. Rolling in the opposite direction has a tendency to split the twisted pipe billet.

A suitable rolling mill for the treatment of thermoplastic pipe has been described in detail in United States Patent 3,089,189 issued May 14, 1963, and assigned to the assignee of this application by Paul Dillon Wolfe. This mill comprises a conical mandrel held by a tension rod over which the pipe is forced. Rolls, rotating in substantially epicyclic fashion about the exterior of the pipe as it passes over the mandrel, roll the pipe to form the finished article. The rolling mill itself may be operated to introduce a twist in the pipe concurrently with the rolling. This is accomplished by operating the rolls with a high degree of overtravel, that is to say, rotation at a rate greater than that required for pure rolling contact on the exterior surface of the pipe while rolling in the same angular direction as the twist direction. This degree of overtravel should be at least 60% and may be as much as 140% or even greater. At the same time, the conical mandrel is retracted so as to narrow the gap between the rolls and the mandrel. A minimum gap between 20% and 40% of the desired finished wall thickness should be used, as measured without load on the mandrel. Under these conditions, a twist opposed to the initial twist is imposed on the pipe during the rolling process. By this means, substantial improvement in the strength of the pipe wall at 45° and at 135° to the axis is obtained relative to the axial and hoop strength increments obtained with a pure rolling operation. This improvement thus corrects the greatest deficiency in the rolling process for the orientation of thermoplastic pipe, while at the same time, supplementing the general improvement obtained by that process. In one case, for example, the rolling process improved the hoop strength of a pipe by 50%. When the pipe was pretwisted to a twist angle of about 45° before rolling, the improvement in hoop strength for a product of the same dimensions was increased to 110%. The burst strength of the pretwisted pipe, however, was in proportion to the hoop strength, whereas a lesser improvement than expected was obtained with the rolling process alone.

Figure 4:
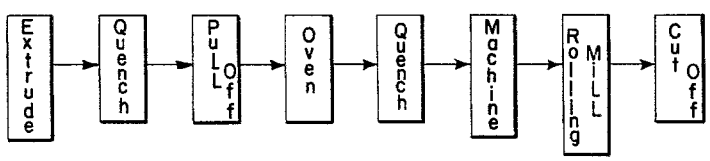
FIGURE 4 is a diagram showing the arrangement of apparatus for a continuous process for the production of thermoplastic seamless pipe oriented by twisting and rolling with optional stretching.

FIGURE 4 shows a schematic layout of a continuous process for the twisting and rolling of thermoplastic pipes. The pipe is extruded by a conventional extruder and die box indicated by the box labelled "extruder" in FIGURE 4. The pipe is then cooled sufficiently to permit its being gripped firmly, by a water spray or other conventional cooling means indicated by the box labelled "quench" in FIGURE 4 adjacent to the extruder. The pipe then passes to a conventional pull-off device indicated by the box labelled "pull-off." This device serves to withdraw the product from the extruder at a controlled, fixed rate, and to prevent rotation of the pipe at that point. The pipe then passes through an oven, labelled "oven" in FIGURE 4, which heats the pipe to its softening temperature. It is in this oven that the twisting takes place, the degree of twist being governed by the speed of the pipe and the rotation of the end farthest from the extruder as explained hereinafter. After leaving the oven the pipe is again cooled to a rigid condition by a water spray or other cooling means indicated by "quench" in the figure. The pipe then passes to a rotating haul-off machine, indicated by "machine" in this figure which is more fully described in FIGURE 5 of the accompanying drawings. From the rotating hand-off device, the pipe now travels to the rolling mill, indicated by "rolling mill" in the figure wherein it is extended substantially in the radical direction by passing over a conical plug within the pipe supported from a rod extending from the extruder die. About the conical plug, which should have a maximum diameter substantially equal to the desired internal diameter of the extruded pipe, rolls rotate in the same rotational sense as the rotating haul-off device so that the pipe is rolled in substantially the circumferential direction. From the rolling mill the pipe then passes to a conventional cut-off device, indicated by the box labelled "cut-off" in the figure which cuts the pipe into suitable lengths for handling and transportation.

Figure 5:
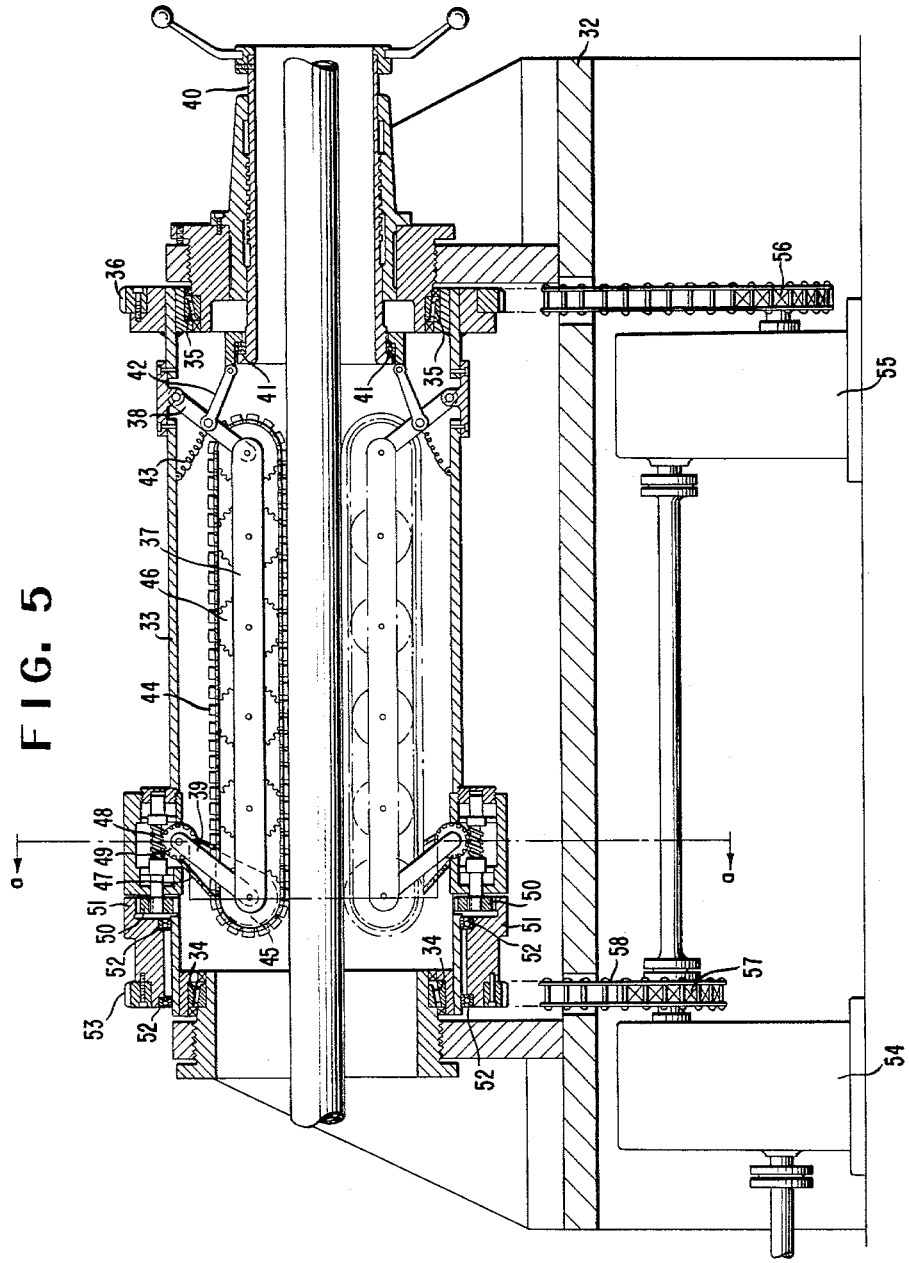
FIGURE 5 shows a side elevation of a novel haul-off device which may be employed in the continuous production of twisted and rolled pipe as outlined in FIGURE 4.

FIGURE 5 of the accompanying drawing is a side view of the rotatable haul-off device employed in the continuous twist orientation process. The haul-off consists of a rigid frame 32 which supports a rotatable steel drum 33 by means of two bearings 34 and 35. A sprocket 36 rigidly attached to the drum 33 provides means for connecting the drum to a driving means to be described more particularly hereinafter. Around the interior of the drum are symmetrically disposed six driven tracking devices for gripping and pulling the thermoplastic pipe, one of which is shown in detail in the figure. Each tracking device is supported on a frame 37 which is suspended from the drum 33 by two sets of pivoted arms 38, 39 forming a parallel linkage. Position adjustment of the linkages and hence the pressure of the tracks gripping the pipe, is provided by the threaded drum 40 which applies tension through bearings 41 and a pivoted link 42 to the suspension linkage 38. Retractive springs 43 hold framework 39 in tension against this mechanism. The track gripping the pipe consists of a series of resilient friction blocks 44 set in a chain which passes over a driving sprocket 45 and a series of idler sprockets 46. The driving sprocket 45 is linked by a chain drive 47 to a worm 48 and pinion 49. The worm is driven by a pinion 50 and a ring gear 51. The ring gear rotates on the outer surface of the drum 33 on ball races 52 and is provided with a sprocket 53 on its outer periphery. The drive for the haul-off unit is provided by motor (not shown) which operates a first positive drive infinitely variable gear 54 which is coupled to a second positive drive infinitely variable gear 55. A sprocket 56 attached to the output of the second drive 55 is coupled with a chain drive to the sprocket 36, thus driving the entire drum 33. A sprocket 57 attached to the first gear 54 provides driving power for the ring gear 51 through a chain 58 and the sprocket 53. By this driving arrangement, the rate of rotation of the haul-off may be adjusted in relation to the speed of the haul-off by the second gear 55. The overall speed of the assembly is determined by the gear 54.

FIGURE 6 shows a sectional view of the rotating haul-off device in which the parts are indicated by the same numbers as those employed in FIGURE 5.

The invention is further illustrated by the following example, which should not, however, be construed as limiting the scope of this invention.

Commercially obtainable polypropylene thermoplastic resin having a melt index of 0.65 was extruded to form a pipe billet using a 2½ inch extruder with a mandrel having a water-cooled end partly within the die. The temperature of the extruder barrel was maintained at 185° C. at the rear, 200° C. in the center, and 210° C. at the front of the barrel. The die temperature was 215° C. The inside diameter of the billet was 1.200 inch and the wall thickness was 0.145 inch. The billet was cooled to room temperature and a 12 inch length excised. This specimen was mounted in the apparatus shown in FIGURES 1, 2, and 3 and a counter-clockwise twist imparted. The working temperature was 165° C. maintained by the steam-heated mandrel assisted by the steam jacket shown in FIGURE 3. The turning head was rotated at 3½ r.p.m. and elongation was simultaneously introduced by movement of the carriage at 8 inches/minute. The pitch length of the resultant twist was 10 inches. The billet was allowed to cool to room temperature, then rolled in a rolling mill with the rolls rotating in a counter-clockwise direction as viewed from the downstream end of the process. The dimensions of the mandrel employed were: length of tapered section 0.97 inch, included mandrel angle 60°; outside diameter at the beginning of the taper 1.200 inch. Three rolls were driven about this mandrel. The angle of the roll axis was 60°. The included roll angle 63° 20' and the outside diameter of the roll at the beginning of the taper was 2.000 inches. The rolls were driven with about 140% of overtravel. The minimum gap between rolls and mandrel was set at 0.020 inch without load. The exact gap under load could not be determined with accuracy but was between about 0.030 inch and 0.040 inch. Each roll rotated about the mandrel ten times for each inch length of pipe feed. The final outside diameter of the pipe was 2.275 inches and the wall thickness of the pipe 0.070 inch. This corresponded to a circumferential deformation of 1.65 times and a longitudinal deformation of 1.1 times for the rolling operation. Tensile specimens were cut from the product pipe and tested in a commercial testing instrument at a crosshead speed of 0.2 inch per minute, and the results were compared with similar tests made on pipe which had been oriented only by the rolling process. The results of these tests are given in Table I.

TABLE I

*Comparison of yield strength of oriented pipes*

| Tensile Test | Yield Strength, p.s.i. | | |
|---|---|---|---|
| | Twisted and Rolled | Rolled only | Unoriented |
| Hoop direction | 6,350 | 5,100 | 3,800 to 4,000 |
| Longitudinal | 4,050 | 3,800 | |
| 45° to Long. axis | 5,750 | 3,850 | |
| 135° to Long. axis | 5,400 | | |

These results show that in addition to the overall improvement in yield strength imparted by the twisting process, the yield strength in intermediate directions to the hoop and axial direction is selectively improved.

While the example has dealt specifically with polypropylene, it will be realized that the process of this invention is applicable to all thermoplastic polymers which may be oriented. Included among these polymers are hydrocarbon polymers, such as low density, free radical polyethylene; high density polyethylene; homopolymers of the 1-olefins; and copolymers of ethylene and the 1-olefins; high molecular weight polyoxymethylene resin; polyoxymethylene copolymers, polyamides, such as polyhexamethylene adipamide (66 nylon), polyhexamethylene sebacamide, polycaprolactam, polyesters, such as polyethylene terephthalate, and the like.

An important feature of this invention is that at least part of the orientation is introduced by a shear process, which, due to the geometry of the system, does not materially change the physical dimensions of the pipe being treated. By the process of shear orientating solid thermoplastic pipes, either alone, or in combination with extension processes, it is possible to obtain pipe structures which have a greater degree of molecular orientation and hence a greater yield strength than can be attained by pure extension processes.

In the case of twisted thermoplastic pipes, without extension, the orientation is essentially unidirectional, in a helical pattern. Very great yield strengths, approaching those attainable with stretched fibers, are attainable along this helical path if a high degree of twist is imparted to the material. The yield strength at right angles to this helical orientation is decreased in comparison with that of the unoriented material. When helical orientation is superimposed upon orientation induced by extension, substantial improvements in the product result. It will be obvious that other expedients may be employed to utilize the high yield strengths imparted to pipe structures by this process. Thus, a layered structure may be manufactured which consists of two concentric thermoplastic pipes helically oriented in opposing directions, whereby the weakness of one pipe is offset by the strength of the other.

In another modification, the inner surface of the pipe is twisted with respect to the outer surface. This may be accomplished by passing the pipe over a closely fitted mandrel, compressing the pipe to grip the mandrel by a casing which closely conforms to the exterior of the pipe, and rotating the mandrel. In this case, shear orientation is induced in the hoop direction. Instead of rotating the mandrel, it may be oscillated so that the resultant deformation is zero.

Yet another modification is to employ a conical mandrel to expand the pipe and engage it in frictional contact with a die to facilitate a process of shear orientation. The mandrel may be rotated with respect to the die, or alternately the die may be rotated with respect to the mandrel.

Twisted seamless pipes may also be employed as the core for fabricated pipe structures made by wrapping oriented tapes of thermoplastic material in a helical manner about the core, the direction of wrapping being opposed to the direction of twist.

Many other modifications of this invention will be apparent to those skilled in the art.

I claim:
1. A process for the manufacture of seamless oriented pipe of thermoplastic material which comprises extruding a thick-walled cylindrical pipe of thermoplastic material, adjusting the temperature of said thick-walled pipe to the softening temperature of the said thermoplastic, twisiting the said thick-walled pipe to a twist angle of from about 10° to about 70° measured from the axial direction and extending the said thick-walled pipe to produce a finished pipe having biaxial orientation and having an external volume at least 10% greater than the external volume of the said thick-walled pipe.

2. Process of claim 1 in which the extension is substantially in the circumferential direction.

3. Process of claim 2 in which the extension is produced by rolling with rolls rotating about the circumference of the pipe in the same angular sense as the twist direction.

References Cited by the Examiner

UNITED STATES PATENTS 2,494,689  1/1950  Canfield et al. _____ 264—280

FOREIGN PATENTS 578,361  6/1959  Canada.

ROBERT F. WHITE, *Primary Examiner.*